Patented Feb. 19, 1952

2,585,988

UNITED STATES PATENT OFFICE 2,585,988

METHOD OF PREPARING AMINOKETONES

Meier Asscher, Eindhoven, Netherlands, assignor to Hartford National Bank and Trust Company, Hartford, Conn., as trustee No Drawing. Application May 24, 1948, Serial No. 28,970. In the Netherlands January 28, 1948

8 Claims. (Cl. 260—570.6)

This invention relates to the manufacture of aminoketones or their reduction products and salts thereof.

It is known that omega-methylamino-acetophenones substituted in the benzene nucleus can be prepared by reaction between the corresponding omega-bromo-acetophenones and methylamine. Thus, for example, it has been proposed, inter alia, to prepare hydroxy-4'-phenyl-1-methylamino-2-ethanone by this method and from that, hydroxy-4'-phenyl-1-methylamino-2-ethanol, which is a recognized pharmaceutical product is obtainable by reduction. Reactions of this kind call for a comparatively large amount of the relatively costly methylamine, since for each molecule of bromo-ketone at least two molecules of methylamine are required. Moreover, only one of these molecules is used to form methylamino-ketone and, in addition, owing to the formation of tertiary amine as a by-product, the yield of secondary amine is not high. Attempts have been made to obviate the latter disadvantage by utilising methyl-benzylamine instead of methylamine, but the total consumption of methylamine is not reduced in this way.

It has now been found by this invention that this disadvantage can be avoided by the use of a different form of reaction.

According to the present invention, a method of preparing aminoketones or their reduction products or salts thereof is characterized in that with the aid of aluminium chloride, in conjunction if desired with hydrochloric acid gas as a condensing agent, a compound having the formula $ROC_6H_5$, in which R is hydrogen, acyl, alkyl or aralkyl, is made to react, in a solvent suitable for the reaction, with a compound having the formula

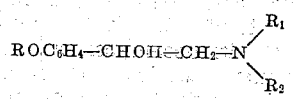

in which $R_1$ and $R_2$ each designate hydrogen, alkyl or aralkyl, or constitute with the N-atom a ring or with a strong-inorganic-acid salt structure thereof.

The reaction which takes place results in the formation of a salt of the imide

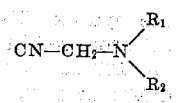

which is adapted to be converted, by the action of water, into an aminoketone

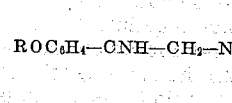

or a salt thereof. This, in turn, may be converted by reduction into an amino-alcohol

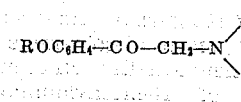

or a salt of this alcohol.

The expression "solvent suitable for the reaction" used in this specification is understood to mean a solvent which, apart from the formation of complex compounds, has no interfering reaction with the reacting constitutents; such a solvent is, for example, nitrobenzene or chlorobenzene.

The yield of aminoketones manufactured according to the invention depends upon the combination of aminonitrile or salt thereof, phenol derivative and solvent and also upon the relative amount of each of these substances used, as well as the duration and temperature of the reaction.

The duration of the reaction may vary from a few hours to a few days. The reaction temperature is preferably between 0° and 70° C.

Particularly satisfactory yields are obtainable by an embodiment of the method of the invention in which use is made of nitrobenzene as the solvent and of the hydrochloric acid salt as the salt of the aminonitrile. When using esters or readily decomposable ethers of phenol, the ester or ether group may be split up during the reaction. If the aminoketones comprise unsubstituted or substituted benzyl groups connected to the N-atom or the phenolic oxygen atom, these groups may be replaced by hydrogen during the reduction of the aminoketones to amino-alcohols.

The method of the invention may be advantageously applied for producing hydroxy-4'-phenyl-1-methylamino-2-ethanone or hydroxy-4'-phenyl-1-methylamino-2-ethanol or their salts. It may also be applied for producing other products such as hydroxy-4'-phenyl-1-isopropylamino-2-ethanone or hydroxy-4'-phenyl-1-isopropyl-amino-2-ethanol or their salts. A further specific application is for producing hydroxy-4'-phenyl-1-amino-2-ethanone or hydroxy-4'-phenyl-1-amino-2-ethanol or their salts.

The invention includes within its scope, substances prepared or produced by the method.

In order to enable the invention to be readily understood, it will now be described more fully with reference to the following examples:

Example 1

30 gms. of anhydrous aluminum chloride were dissolved in 60 mgs. of nitrobenzene and after cooling to room temperature the solution had added to it, while stirring, a mixture of 14 gms. of phenol and 11 gms. of N-methyl-amino-acetonitrile-hydrochloride $(CN-CH_2-NH-CH_3-HCl)$ Dry hydrochloric acid gas was then introduced for three hours during stirring, the temperature being kept between 20° and 30° C. The reaction mixture, while being cooled with ice, then had added to it 55 cc. of water and thereupon was boiled for ten minutes, with stirring. On cooling the solid substance was filtered under suction and washed with a mixture of acetone and ethyl alcohol. The solid substance was then dissolved in 100 cc. of water, a solution of 30 gms. of sodium-potassium tartrate in 50 cc. of water was added and the whole made slightly alkaline with aqueous ammonia. The crystalline hydroxy-4'-phenyl-1-methylamino-2-ethanone precipitated was sucked off, washed with a little water and dried. The yield was 12 gms. (71% of the theoretical yield calculated for N-methylamino-acetonitrile); the product had a melting point of 143° to 145° C. with decomposition.

An experiment carried out in an identical manner but in which the reaction mixture, after introduction of hydrochloric acid gas, was stored for 6 days at room temperature and then treated as above, yielded 11 gms. of hydroxy-4'-phenyl-1-methylamino-2-ethanone.

33 gms. of hydroxy-4'-phenyl-1-methylamino-2-ethanone produced in the above manner was dissolved, together with 15 gms. of alpha-tartaric acid, in 125 cc. of hot water. Upon cooling 31.5 gms. of neutral tartrate of the aminoketone crystallised having a melting point at from 193° to 195° C. with decomposition.

18 gms. of this tartrate were suspended in 75 cc. of water and hydrogenated with hydrogen in the presence of 1.5 gms. of a nickel catalyst (made from a nickel-aluminium alloy) and whilst shaking so long as hydrogen was absorbed. The solution, separated from the catalyst by filtering after evaporation to a small volume and admixture with acetone, yielded 14.5 gms. of neutral tartrate of hydroxy-4'-phenyl-1-methylamino-2-ethanol, melting at from 187° to 188° C. with decomposition. After recrystallisation from dilute alcohol the melting point becomes from 189° to 190° C. with decomposition.

To explain this it may be observed that sodium-potassium tartrate is added to keep aluminium, which otherwise when made alkaline would precipitate as a hydroxide, in solution as a complex ion. Instead of employing sodium-potassium tartrate for this purpose, resort may be had to an alkali salt of citric acid or lactic acid. It is cheapest and preferable to use an alkali salt of lactic acid.

Example 2

A solution of 30 gms. of anhydrous aluminium chloride in 60 gms. of nitrobenzene had added to it a mixture of 14 gms. of phenol and 11 gms. of the hydrochloride of N-methyl-amino-acetonitrile. The mixture thus obtained was stirred, with the exclusion of air, for three hours at approximately 30° C. Whilst cooling, 75 cc. of water were added and stirring was then continued for half an hour at from 0° to 5° C. The crystalline precipitate obtained was then filtered under suction and washed with 50 ccs. of a mixture of three parts of acetone and one part of ethyl alcohol. The yield was 4.8 gms. of hydrochloride of hydroxy-4'-phenyl-1-methyl-amino-2-ethanone.

A solution in water of 2 gms. of the hydrochloride of hydroxy-4'-phenyl-1-methyl-amino-2-ethanone produced in the manner above described, and to which solution was added 91 mgs. of palladium oxide and 6 mgs. of platinum oxide, was treated with hydrogen during shaking until 270 cc. of the hydrogen were absorbed. After separation of the catalyst by filtering, the solution was evaporated to approximately 10 cc. and made alkaline by ammonia. The precipitated hydroxy-4'-phenyl-1-methyl-amino-2-ethanol weighed 1.2 gms. and melted at from 184° to 185° C. whilst decomposing.

Example 3

A solution of 7 gms. of N-methylamino-acetonitrile in 52 gms. of chlorobenzene was saturated with dry hydrochloric acid gas under stirring and cooling. The mixture then had added to it during stirring and ice-cooling 10.5 gms. of phenol and, fraction by fraction, 26 gms. of dry aluminium chloride. Eventually it was heated at 60° C. and dry hydrochloric acid gas was introduced for 7.5 hours whilst stirring. After storing for one night at room temperature, 37 cc. of water were added and stirring was resumed for half an hour during cooling with ice. The precipitate thus obtained was sucked off and washed with ethyl alcohol and acetone. Thereafter, the washed precipitate was dissolved in water, the solution treated with decolourising carbon and hydroxy-4'-phenyl-1-methylamino-2-ethanone precipitated by rendering the solution slightly alkaline by aqueous ammonia. The yield was 3.2 gms.

Example 4

A solution of 33 gms. of aluminium chloride in 60 gms. of nitrobenzene had added to it a mixture of 14 gms. of phenol and 12 gms. of the neutral sulphuric acid salt of N-methyl-amino-acetonitrile $(CN-CH_2-NH-CH_3)_2-H_2SO_4$. Whilst keeping the temperature below 30° C., dry hydrochloric acid gas was introduced for 4.5 hours, with stirring. After the reaction mixture had been stored at room temperature for one night, 60 cc. of water were added to it during stirring and ice-cooling. It was then boiled for 10 minutes and after cooling the precipitate obtained was sucked off and washed with acetone.

The washed precipitate was dissolved in 200 cc. of water and the solution decolourised with carbon. A solution of 30 gms. of sodium-potassium tartrate in 100 cc. of water was then added and, by slightly alkalising with aqueous ammonia, hydroxy-4'-phenyl-1-methylamino-2-ethanone was precipitated. The yield was 7 gms. and there was an additional yield from the mother liquor of 0.56 gm.

20.5 gms. of the hydroxy-4'-phenyl-1-methyl-amino-2-ethanone produced in the above manner were suspended in 100 cc. of water and 10 gms. of 36% hydrochloric acid were added, the base being completely dissolved. The solution thus obtained was treated with a small quantity of decolourising carbon and then hydrogenated with hydrogen and a nickel catalyst prepared from a nickel-aluminium alloy. Upon absorption by the solution of the calculated amount of hydrogen, the catalyst was separated by filtering and the filtrate was made alkaline with ammonia, hydroxy-4'-phenyl-1-methylamino-2-ethanol thus crystallising from the alkaline solution. The yield was 14.3 gms. in colourless crystals, melting at from 186° to 187° C. with decomposition.

Example 5

A solution of 108 gms. of anhydrous aluminium chloride in 240 gms. of nitrobenzene had added to it 64 gms. of phenol-methyl-ether and 44 gms. of hydrochloride of N-methylamino-acetonitrile, whereupon dry hydrochloric acid gas was introduced for 6 hours during stirring at a temperature of between 20° and 30° C. Then, with further stirring and ice-cooling, 250 cc. of water were slowly added, the cooling being continued to 0° C., whereupon the precipitate formed was drawn off and washed with acetone. The precipitate was then heated at 100° to 120° C. for a considerable time in vacuo and then extracted with anhydrous ethyl alcohol. From the extract hydrochloride of methoxy-4' - phenyl-1-methylamino-2-ethanone was crystallised and this, after recrystallisation from dry ethanol was found to melt at from 211° to 214° C. with decomposition. The yield was 38 gms. and the product had a chlorine content of 16.54% (calculated percentage: 16.45).

On heating this hydrochloride with a 48% solution of hydrobromic acid at 150° C. in a closed tube and subsequently making the solution slightly alkaline by ammonia, hydroxy-4'-phenyl-1-methylamino-2-ethanone was obtained.

Example 6

A solution of 33 gms. of anhydrous aluminium chloride in 60 gms. of nitrobenzene had added to it, whilst stirring and cooling, a mixture of 29.7 gms. of the phenyl ester of benzoic acid and 11 gms. of hydrochloride of N-methyl-amino-acetonitrile. Dry hydrochloric acid gas was then introduced for 8 hours. After heating it for a short time at 60° C., the product was cooled to room temperature and then 60 cc. of water were added during stirring, provision being made for further cooling so that the temperature did not rise above 50° C. The product was thereafter cooled to room temperature and the precipitate obtained was drawn off, washed with acetone and dissolved in half a litre of water. 25 gms. of sodium-potassium tartrate were then dissolved in the solution and the latter subsequently made slightly alkaline by ammonia. The deposit obtained was suspended in ethyl alcohol and alcoholic hydrochloric acid added to pH 5 whereupon, by adding butanone-2, the hydrochloride of benzoyl-oxy-4'-phenyl-1-methylamino-2 - ethanone was caused to crystallise out. After recrystallisation from a mixture of ethyl alcohol and butanone-2, the melting point was found to be from 243° to 245° C. with decomposition. Analysis showed: C=62.88%, H=5.18% and Cl=11.75%, (calculated percentages of C:62.90, of H:5.23 and of Cl:11.60).

Example 7

A solution of 33 gms. of anhydrous aluminium chloride in 60 gms. of nitrobenzene, to which a mixture of 14 gms. of phenol and 9.3 gms. of hydrochloride of amino-aceto-nitrile was added, had dry hydrochloric acid gas introduced into it for 3 hours, while stirring and cooling to keep the temperature between 20 and 30° C. The reaction mixture was then poured, with cooling, into 70 cc. of water and the deposit obtained was sucked off, washed with acetone and dissolved in 300 cc. of water. The solution thus prepared was decolourised with carbon, 50 gms. of 30% sodium citrate solution were added to it, and then it was made slightly alkaline with ammonia. Thereupon hydroxy - 4' - phenyl-1-amino-2-ethanone crystallised out in the form of leaflets. The yield was 7.7 gms.

The hydrochloride of this base, obtained by evaporation to dryness of a solution of the base in dilute hydrochloric acid and subsequent treatment of the residue with ethyl alcohol and acetone, had a chlorine content of 18.84%, (calculated figure: 18.90%).

This hydrochloride, on being dissolved in water and hydrogenated with hydrogen and a nickel catalyst, gave a good yield of hydrochloride of hydroxy - 4'-phenyl-1-amino - 2 - ethanol melting, after crystallisation from a mixture of ethyl alcohol and butanone-2, at from 177° to 179° C. with decomposition.

Example 8

67 gms. of isopropylamine-hydrochloride were dissolved in 91 gms. of formalin and, while cooling so that the temperature did not rise above 0° C., this solution had slowly added to it a solution of 33.5 gms. of sodium cyanide in 67 cc. of water. After storing the reaction mixture for one night at room temperature, the upper layer was separated out and the lower, aqueous, layer was extracted with carbon tetrachloride and the extract mixed with the upper layer. The solution of N-isopropyl-amino-acetonitrile in carbon tetrachloride thus obtained was washed with water and then the carbon tetrachloride was removed by distillation under reduced pressure. The nitrile was dissolved in ethyl alcohol and converted into the hydrochloride by means of a solution of hydrochloric acid in ethyl alcohol. The hydrochloride of N-isopropyl-amino-acetonitrile thereby obtained formed colourless needles and after recrystallisation from a mixture of ethyl alcohol and butanone-2 was found to melt at 168° to 169° C. with decomposition.

A mixture of 13.5 gms. of such hydrochloride and 14 gms. of phenol was added to a solution of 33 gms. of anhydrous aluminium chloride in 60 gms. of nitrobenzene, and then, while stirring and so cooling that the temperature remained between 30° and 40° C., dry hydrochloric acid gas was introduced for three hours. The reaction mixture was then poured out, with cooling into 100 cc. of water and an hour later the separated solid substance was sucked off and washed with acetone. Upon recrystallisation, 14 gms. of hydroxy-4'-phenyl - 1 - isopropyl - amino - 2 - ethanone-hydrochloride were obtained.

Example 9

A mixture of 25 gms. of 40%-formaldehyde solution and a saturated aqueous solution of 26 gms. of sodium bisulphite was heated for half an hour on a boiling water bath. After cooling, 30 gms. of methyl-benzyl-amine were added while shaking. Into the suspension produced, which was cooled with ice, a solution of 13 gms. of sodium cyanide in 25 cc. of water was dropped, during stirring, over a period of a quarter of an hour. After stirring for a further hour at room temperature, the nitrile layer was separated out, the water layer extracted with ether and the extract combined with the nitrile layer and the whole dried on sodium sulphate. Subsequently to separation of the ether by distillation, the remainder was distilled under reduced pressure, with the result that 32 gms. of N-methyl-N-benzyl-amino-acetonitrile were obtained, boiling at 108° to 112° C. under a pressure of 2 mm. of mercury.

The chloride of the N-methyl-N-benzylamino-acetonitrile was then prepared suitably in the manner described in Example 8 for N-isopropyl-amino-acetonitrile.

To a solution of 22 gms. of aluminum chloride in 40 gms. of nitrobenzene, were added 9.3 gms. of phenol and 13.1 gms. of the hydrochloride of N-methyl-N-benzyl-amino-acetonitrile and then, while stirring and so cooling that the temperature remained between 20 and 30° C., dry hydrochloride acid gas was introduced for 6 hours.

Next the reaction mixture had added to it a saturated solution of ammonium sulphate in 55 cc. of water. It was then boiled for a short period and after cooling, the solid substance was then sucked off and washed with acetone. The filtrate, which consisted of a nitrobenzene layer and an aqueous layer, was combined with the washing liquid and after that the aqueous layer was separated out and washed with chloroform to remove any nitrobenzene left therein. The aqueous layer thus treated, which contains the desired reaction product, was then boiled for a short period with decolouring carbon, filtered and cooled. 25 gms. of sodium-potassium tartrate were then dissolved in the solution and ammonia added until a slight alkaline reaction prevailed. Thereupon, 4.5 gms. of crude hydroxy-4'-phenyl-methyl-benzylamino-2-ethanone were separated out and purified by recrystallisation from dilute ethyl alcohol, the base crystallising therefrom with one molecule of water of crystallisation.

1.27 gms. of the hydroxy-4'-phenyl-1-N-methyl-benzylamino-2-ethanone thus produced were dissolved in the exact amount of dilute hydrochloric acid and the solution hydrogenated by hydrogen using a nickel catalyst prepared from an aluminum-nickel alloy. The amount of hydrogen absorbed by the solution corresponded to two molecules per molecule of aminoketone. After filtering off the catalyst the filtrate, which smelt of toluol, was evaporated to a small volume and the hydroxy-4'-phenyl-1-methylamino-2-ethanol produced was precipitated by adding ammonia. The yield was 0.5 gm., melting at from 183° to 185° C. with decomposition.

What I claim is:

1. A method of preparing an aminoketone, comprising the steps of reacting a compound having the formula:

$ROC_6H_5$ in which R is a member of the group consisting of hydrogen, acyl, alkyl, and aralkyl substituents with a compound having the formula:

in which $R_1$ and $R_2$ are each respectively a member selected from the group consisting of hydrogen, alkyl and aralkyl substituents and strong inorganic salts thereof in a solvent selected from the group consisting of chlorobenzene and nitrobenzene with aluminum chloride to form a salt of the imide:

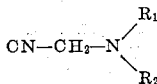

and thereafter reacting the latter compound with water to convert the same to an aminoketone having the formula:

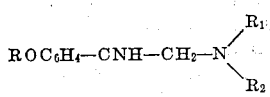

2. A method of preparing an aminoketone as claimed in claim 1, in which an alkali salt of an acid selected from the group consisting of mono-, di-, and polybasic hydroxy acids is added to the reaction mixture of water and the imide compound to preserve the aluminum in solution as a complex ion.

3. A method of preparing an aminoketone as claimed in claim 1, in which the solvent is nitrobenzene and the salt of the compound:

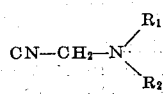

is the hydrochloric acid salt.

4. A method of preparing an aminoketone as claimed in claim 1, in which the reaction of the compounds producing the salt of the imide compound is maintained between 0° C. and 70° C.

5. A method of preparing an aminoketone as claimed in claim 1, in which the compound:

$ROC_6H_5$ is a phenol.

6. A method of preparing an aminoketone as claimed in claim 1, in which the compound:

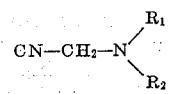

is a methyl-amino-acetonitrile.

7. A method of preparing an aminoketone as claimed in claim 1, in which the compound:

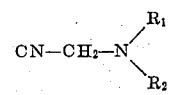

is an isopropyl-amino-acetonitrile.

8. A method of preparing an aminoketone as claimed in claim 1, in which the compound:

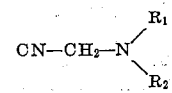

is a benzyl-amino-acetonitrile.

MEIER ASSCHER.

REFERENCES CITED

The following references are of record in the file of this patent:

UNITED STATES PATENTS

| Number | Name | Date |
|---|---|---|
| 1,767,423 | Adams | June 24, 1930 |
| 2,108,133 | McCall | Feb. 15, 1938 |

FOREIGN PATENTS

| Number | Country | Date |
|---|---|---|
| 566,578 | Germany | Dec. 17, 1932 |

OTHER REFERENCES

Hoesch, Berichte, vol. 41, pp. 1122–1133 (1915).
Houben, Berichte, vol. 59B, pp. 2878–2891 (1926).
Houben et al., Berichte, vol. 60B, pp. 1759–1778 (1927).
Houben et al., Berichte, vol. 63B, pp. 2455–2463 (1930).
Houben et al., Berichte, vol. 64B, pp. 2645–2653 (1931).
Sonn et al., Berichte, 55, pp. 2975–2985 (1922).
Slater et al., J. of Chem. Soc., 117, 312–315 (1920).
Heap et al., J. of Chem. Soc., 1926, 2338–2339.
Sonn, Berichte 51, pp. 1829–1832 (1918).